(12) United States Patent  
Seo et al.

(10) Patent No.: US 12,576,351 B2  
(45) Date of Patent: Mar. 17, 2026

(54) BATCH-TYPE APPARATUS FOR FILTERING

(71) Applicant: SAMSUNG ELECTRONICS CO., LTD., Suwon-si (KR)

(72) Inventors: Hyungtae Seo, Suwon-si (KR); Hyun Do Choi, Suwon-si (KR); Hyunjeong Jeon, Suwon-si (KR); Joon-Kee Cho, Suwon-si (KR); Jun-Won Jang, Suwon-si (KR); Wooram Hong, Suwon-si (KR); Jeonghun Kim, Suwon-si (KR); Won Je Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 548 days.

(21) Appl. No.: 18/123,628

(22) Filed: Mar. 20, 2023

(65) Prior Publication Data

US 2023/0364537 A1     Nov. 16, 2023

(30) Foreign Application Priority Data

May 16, 2022     (KR) ........................ 10-2022-0059753

(51) Int. Cl.  
B01D 37/04 (2006.01)  
B01D 27/10 (2006.01)  
B01D 35/157 (2006.01)

(52) U.S. Cl.  
CPC ......... B01D 37/041 (2013.01); B01D 27/108 (2013.01); B01D 35/1573 (2013.01); (Continued)

(58) Field of Classification Search  
CPC ................ B01D 37/041; B01D 27/108; B01D 35/1573; B01D 37/046; B01D 2201/165; (Continued)

(56) References Cited

U.S. PATENT DOCUMENTS 3,976,729 A     8/1976   Lewis et al.  
6,176,323 B1     1/2001   Weirich et al.  
(Continued)

FOREIGN PATENT DOCUMENTS

JP     3696611 B2     9/2005  
JP     3996056 B2     10/2007  
(Continued)

OTHER PUBLICATIONS

D. P. Wasalathanthri et al., "Real-Time Monitoring Of Quality Attributes By In-Line Fourier Transform Infrared Spectroscopic Sensors At Ultrafiltration And Diafiltration Of Bioprocess", Biotechnology and Bioengineering, 2020, (25 pages).

*Primary Examiner* — Waqaas Ali  
(74) *Attorney, Agent, or Firm* — Sughrue Mion, PLLC

(57)     ABSTRACT

A batch-type filtering apparatus includes: a first flow path; a second flow path configured to communicate with the first flow path; a third flow path configured to communicate with the first flow path; a fourth flow path configured to communicate with each of the second flow path and the third flow path; an external port configured to communicate with each of the third flow path and the fourth flow path; a first direction switching valve configured to allow at least two from among the first flow path, the second flow path, and the third flow path to communicate with each other; a second direction switching valve configured to allow at least two from among the third flow path, the fourth flow path, and the external port to communicate with each other; and a flow cell.

20 Claims, 8 Drawing Sheets

(52) U.S. Cl.
CPC ...... *B01D 37/046* (2013.01); *B01D 2201/165* (2013.01); *B01D 2201/295* (2013.01); *B01D 2201/4061* (2013.01)

(58) Field of Classification Search
CPC ...... B01D 2201/295; B01D 2201/4061; B01D 2201/086; B01D 2201/087; B01D 29/66; B01D 35/306; B01D 35/00; B01D 35/147; B01D 37/04; G01N 21/33; G01N 21/65
See application file for complete search history.

(56) References Cited

U.S. PATENT DOCUMENTS

| | | |
|---|---|---|
| 6,686,594 B2 | 2/2004 | Ji et al. |
| 6,753,186 B2 | 6/2004 | Moskoff |
| 6,787,758 B2 | 9/2004 | Tubel et al. |
| 6,952,945 B2 | 10/2005 | O'Brien |
| 6,969,865 B2 | 11/2005 | Duchon et al. |
| 6,994,169 B2 | 2/2006 | Zhang et al. |
| 7,040,399 B2 | 5/2006 | Wellington et al. |
| 7,461,547 B2 | 12/2008 | Terabayashi et al. |
| 7,741,121 B2 | 6/2010 | Elizarov et al. |
| 7,745,221 B2 | 6/2010 | Butler et al. |
| 7,978,329 B2 | 7/2011 | Padmanabhan et al. |
| 8,519,358 B2 | 8/2013 | Ingber et al. |
| 8,885,913 B2 | 11/2014 | Basiji et al. |
| 10,030,086 B1 | 7/2018 | Yang et al. |
| 2005/0146717 A1 | 7/2005 | Cerni |
| 2021/0180711 A1 | 6/2021 | Van Riel et al. |

FOREIGN PATENT DOCUMENTS

| | | | |
|---|---|---|---|
| JP | 2010253418 A | * | 11/2010 |
| KR | 10-1600413 B1 | | 3/2016 |
| KR | 10-1655772 B1 | | 9/2016 |
| WO | 93/22055 A2 | | 11/1993 |
| WO | 2012/151473 A2 | | 11/2012 |
| WO | 2014/037395 A1 | | 3/2014 |

* cited by examiner

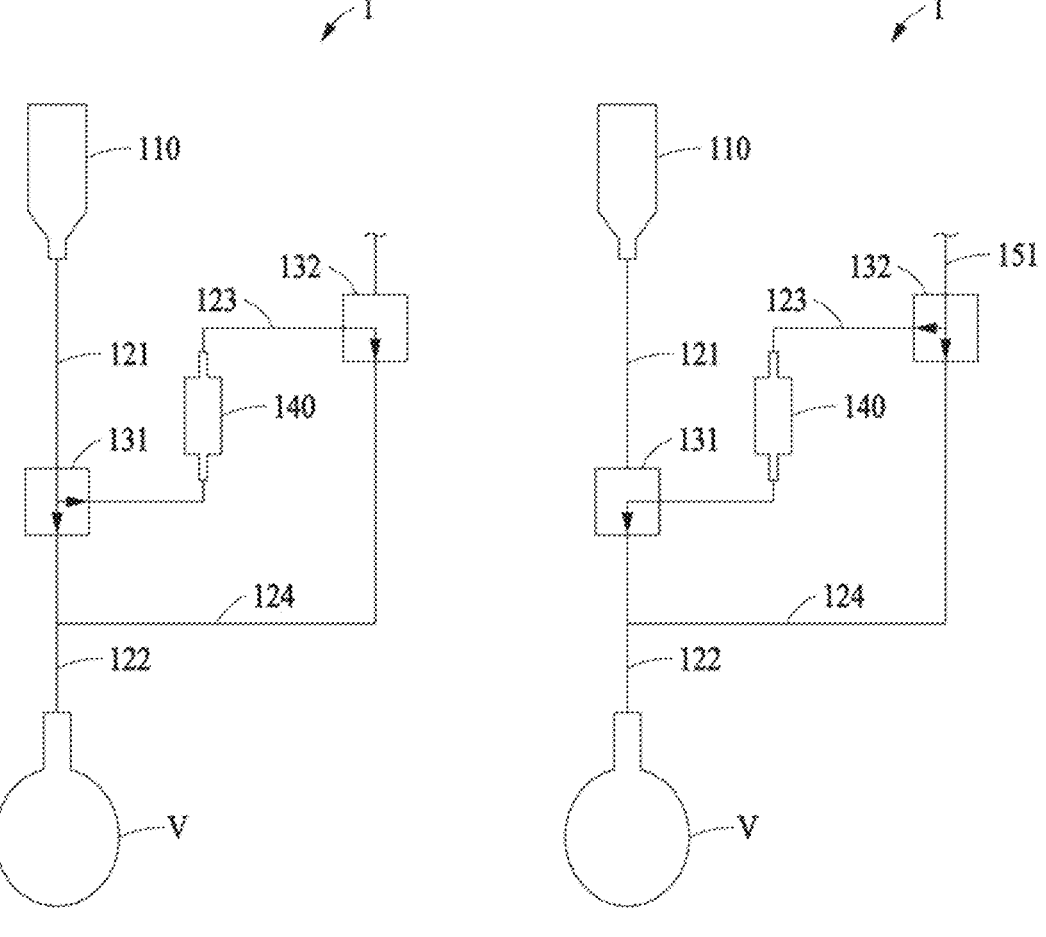
FIG. 5                   FIG. 6

BATCH-TYPE APPARATUS FOR FILTERING

CROSS-REFERENCE TO THE RELATED APPLICATION

This application claims priority under 35 U.S.C. § 119 to Korean Patent Application No. 10-2022-0059753 filed on May 16, 2022, in the Korean Intellectual Property Office, the disclosure of which is incorporated herein by reference in its entirety.

BACKGROUND

1. Field

Methods and apparatuses consistent with example embodiments of the present disclosure relate to a batch-type filtering apparatus.

2. Description of the Related Art

There is a desire for technology for monitoring filtrate in real time for a batch-type filtering apparatus in addition to a continuous flow-type filtering apparatus.

SUMMARY

One or more example embodiments of the present disclosure may address at least the above problems and/or disadvantages and other disadvantages not described above. Also, the example embodiments of the present disclosure are not required to overcome the disadvantages described above, and an example embodiment may not overcome any of the problems described above.

According to embodiments of the present disclosure, a batch-type filtering apparatus is provided. The batch-type filtering apparatus may include: a filter cartridge; a first flow path configured to guide filtrate received from the filter cartridge; a second flow path configured to communicate with the first flow path; a third flow path configured to communicate with the first flow path: a fourth flow path configured to communicate with each of the second flow path and the third flow path: an external port configured to communicate with each of the third flow path and the fourth flow path: a first direction switching valve configured to allow at least two from among the first flow path, the second flow path, and the third flow path to communicate with each other; a second direction switching valve configured to allow at least two from among the third flow path, the fourth flow path, and the external port to communicate with each other: a flow cell connected to the third flow path, and configured to store therein the filtrate that has passed through the first flow path and the first direction switching valve while the first flow path and the third flow path are in communication via the first direction switching valve; and a vessel connected to the second flow path, and configured to store therein the filtrate discharged from the second flow path.

According to one or more embodiments of the present disclosure, the first direction switching valve is configured to cause the first flow path to be in communication with the second flow path without being in communication with the third flow path, and wherein, while the first flow path is in communication with the second flow path without being in communication with the third flow path, the filtrate discharged from the filter cartridge moves to the vessel without passing through the flow cell.

According to one or more embodiments of the present disclosure, the first direction switching valve is configured to cause the first flow path to be in communication with the third flow path without being in communication with the second flow path, and wherein, while the first flow path is in communication with the third flow path without being in communication with the second flow path, the filtrate discharged from the filter cartridge moves to the flow cell.

According to one or more embodiments of the present disclosure, the first direction switching valve is configured to cause the first flow path to be in communication with each of the second flow path and the third flow path, simultaneously, and wherein, while the first flow path is in communication with each of the second flow path and the third flow path, a portion of the filtrate discharged from the filter cartridge moves to the vessel without passing through the flow cell, and a remaining portion of the filtrate moves to the flow cell.

According to one or more embodiments of the present disclosure, the batch-type filtering apparatus of claim 1 may further include a detector configured to sense the filtrate stored in the flow cell.

According to one or more embodiments of the present disclosure, the detector is configured to optically sense the filtrate.

According to one or more embodiments of the present disclosure, a first portion of the flow cell connected to the first direction switching valve is positioned under, with respect to a direction of gravity, a second portion of the flow cell connected to the second direction switching valve.

According to one or more embodiments of the present disclosure, the first direction switching valve and the second direction switching valve are each a three-way valve.

According to one or more embodiments of the present disclosure, the batch-type filtering apparatus may further include a controller configured to control each of the first direction switching valve and the second direction switching valve.

According to one or more embodiments of the present disclosure, the batch-type filtering apparatus may further include a filter adapter including: an adapter body configured to support the filter cartridge; and a plurality of grooves recessed on an inclined surface of the adapter body facing the filter cartridge.

According to one or more embodiments of the present disclosure, the batch-type filtering apparatus may further include a vessel pump connected to the vessel and configured to reduce a pressure in the vessel.

According to one or more embodiments of the present disclosure, the batch-type filtering apparatus may further include a solvent flow path connected to the external port and configured to guide a solvent from an outside to the flow cell.

According to one or more embodiments of the present disclosure, the batch-type filtering apparatus may further include: a fifth flow path configured to communicate with the fourth flow path; and a third direction switching valve configured to guide the filtrate that has passed through the second direction switching valve to any one from among the second flow path and the fifth flow path.

According to one or more embodiments of the present disclosure, the batch-type filtering apparatus may further include: an auxiliary filter cartridge; a main feedback path configured to communicate with each of the fifth flow path and the filter cartridge; and an auxiliary feedback path configured to communicate with each of the fifth flow path and the auxiliary filter cartridge.

According to one or more embodiments of the present disclosure, the batch-type filtering apparatus may further include a loader configured to support the vessel and move the vessel.

According to embodiments of the present disclosure, a batch-type filtering apparatus is provided. The batch-type filtering apparatus may include: a first flow path: a second flow path configured to communicate with the first flow path: a third flow path configured to communicate with the first flow path; a fourth flow path configured to communicate with each of the second flow path and the third flow path: an external port configured to communicate with each of the third flow path and the fourth flow path: a first direction switching valve configured to allow at least two from among the first flow path, the second flow path, and the third flow path to communicate with each other; a second direction switching valve configured to allow at least two from among the third flow path, the fourth flow path, and the external port to communicate with each other; and a flow cell connected to the third flow path, and configured to store therein filtrate that has passed through the first flow path and the first direction switching valve while the first flow path and the third flow path are in communication via the first direction switching valve.

According to one or more embodiments of the present disclosure, the batch-type filtering apparatus may further include a detector configured to sense the filtrate stored in the flow cell.

According to one or more embodiments of the present disclosure, the detector is configured to optically sense the filtrate.

According to one or more embodiments of the present disclosure, a first portion of the flow cell connected to the first direction switching valve is positioned under, with respect to a direction of gravity, a second portion of the flow cell connected to the second direction switching valve.

According to one or more embodiments of the present disclosure, the batch-type filtering apparatus may further include a controller configured to drive each of the first direction switching valve and the second direction switching valve.

BRIEF DESCRIPTION OF THE DRAWINGS

The above and/or other aspects will be more apparent by describing certain example embodiments, taken in conjunction with the accompanying drawings, in which:

FIG. 5 is a schematic diagram illustrating an example of a batch-type filtering apparatus provided in a two-way type according to an example embodiment:

FIG. 6 is a schematic diagram illustrating an example of a batch-type filtering apparatus provided in a type for clearing according to an example embodiment:

DETAILED DESCRIPTION

Figure 1:
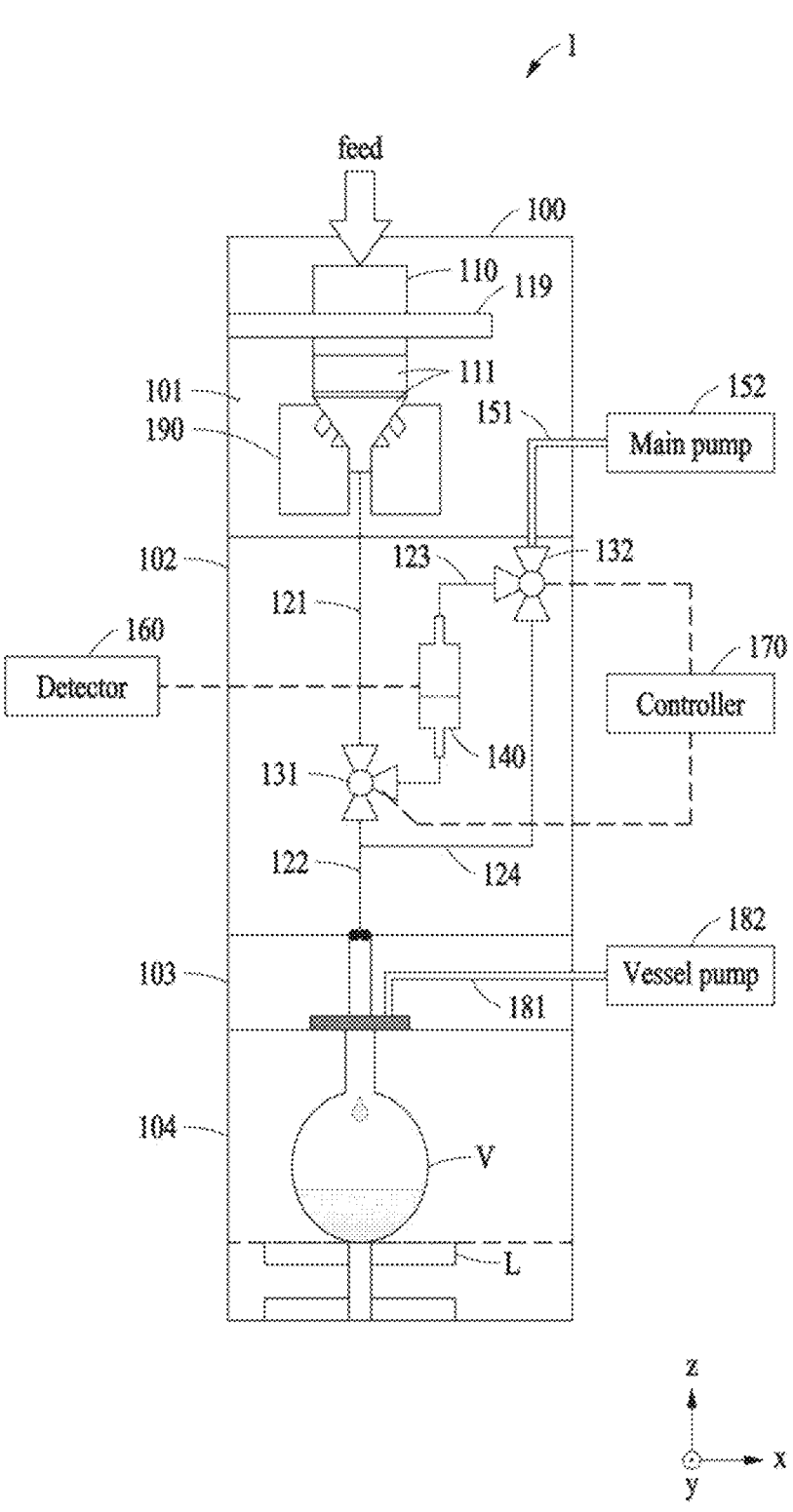
FIG. 1 is a diagram illustrating an example of a batch-type filtering apparatus according to an example embodiment.

Reference will now be made in detail to example embodiments, examples of which are illustrated in the accompanying drawings, wherein like reference numerals refer to the like elements throughout.

The following structural or functional descriptions are examples to merely describe the example embodiments of the present disclosure, and the scope of embodiments of the present disclosure is not limited to the descriptions provided in the disclosure. Various changes and modifications can be made thereto by those of ordinary skill in the art.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the present disclosure.

It will be understood that when a component is referred to as being "connected to" another component, the component can be directly connected or coupled to the other component or intervening components may be present.

As used herein, the singular forms are intended to include the plural forms as well, unless the context clearly indicates otherwise. It should be further understood that the terms "comprises," "comprising," "includes," and/or "including," when used in this specification, specify the presence of stated features, integers, steps, operations, elements, components or a combination thereof, but do not preclude the presence or addition of one or more other features, integers, steps, operations, elements, components, and/or groups thereof. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Unless otherwise defined herein, all terms used herein including technical or scientific terms have the same meanings as those generally understood by one of ordinary skill in the art. Terms defined in dictionaries generally used should be construed to have meanings matching with contextual meanings in the related art and are not to be construed as an ideal or excessively formal meaning unless otherwise defined herein.

FIG. 1 is a diagram illustrating an example of a batch-type filtering apparatus according to an example embodiment.

Referring to FIG. 1, a batch-type filtering apparatus (hereinafter the "filtering apparatus 1") may filter a target material and guide filtrate obtained by the filtering to a vessel V. Before guiding the filtrate to the vessel V, the filtering apparatus 1 may temporarily store at least a portion of the filtrate in a flow cell and sense the filtrate. According to an example embodiment, the filtering apparatus 1 may include a housing 100, a filter cartridge 110, a plurality of flow paths (e.g., a first flow path 121, a second flow path 122, a third flow path 123, and a fourth flow path 124), a plurality of direction switching valves (e.g., a first direction switching valve 131 and a second direction switching valve 132), a flow cell 140, an external port 151, a main pump 152, a detector 160, a controller 170, a vessel port 181, a vessel pump 182, a filter adapter 190, a vessel V, and a loader L.

The housing 100 may form an exterior of the filtering apparatus 1. The housing 100 may include a plurality of parts provided in parallel in a direction of gravity (e.g., a z-axis direction). The housing 100 may be provided in a form with the parts being detachable. The housing 100 may include an input part 101, a flow path part 102, a pressure control part 103, and a vessel part 104. The input part 101, the flow path part 102, the pressure control part 103, and the vessel part 104 may be sequentially arranged in the direction of gravity. Each of the input part 101, the flow path part 102, the pressure control part 103, and the vessel part 104 may be provided to be detachably attached to a part nearby (e.g., the vessel part 104 may be detachably attached to the pressure control part 103).

The filter cartridge 110 may be disposed in the input part 101. The input part 101 may include a support plate 119 for supporting the filter cartridge 110. For example, the support plate 119 may have a hole for accommodating the filter cartridge 110. The filter cartridge 110 may include a plurality of filter media 111. The filter media 111 may be arranged in parallel to each other in the direction of gravity. Filtrate that has passed through the filter cartridge 110 may be guided downward (e.g., in a −z direction) through the first flow path 121. A portion of the first flow path 121 may be provided in the input part 101, and a remaining portion of the first flow path 121 may be provided in the flow path part 102.

The flow path part 102 may include the flow paths (e.g., the first flow path 121, the second flow path 122, the third flow path 123, and the fourth flow path 124), the direction switching valves (e.g., the first direction switching valve 131 and the second direction switching valve 132), and the flow cell 140. The flow path part 102 may be provided to be attachable to or detachable from each of the input part 101 and the pressure control part 103.

The pressure control part 103 may control a pressure in the vessel V. For example, the pressure control part 103 may reduce the pressure inside the vessel V. The pressure control part 103 may be provided to be attachable to or detachable from the flow path part 102 and the vessel part 104. The pressure control part 103 may be selectively provided. For example, the filtering apparatus 1 may not include the pressure control part 103. In this example, the flow path part 102 may be directly connected to the vessel part 104.

The vessel part 104 may receive therein the vessel V. The loader L may be provided under the vessel part 104. The loader L may support the vessel V. The loader L may move the vessel V in a vertical direction. For example, the vessel V may move upward (e.g., in a +z direction) while being disposed on the loader L. An upper end of the vessel V may be connected to the pressure control part 103, hermetically sealing an internal space of the vessel V.

The filter cartridge 110 may receive therein the target material. The filter cartridge 110 may include the filter media 111. At least a portion of the target material may be filtered out by the filter media 111. The filtrate that has passed through the filter media 111 may enter the first flow path 121.

The flow paths may include the first flow path 121, the second flow path 122, the third flow path 123, and the fourth flow path 124 that are provided to communicate with each other.

One end of the first flow path 121 may be connected to the filter cartridge 110, and the other end thereof may be connected to the first direction switching valve 131. The first flow path 121 may guide downward the filtrate received from the filter cartridge 110.

One end of the second flow path 122 may be connected to the first direction switching valve 131, and the other end thereof may be connected to the pressure control part 103 or the vessel V. The second flow path 122 may guide the filtrate to the vessel V. The second flow path 122 may communicate with the first flow path 121 and the fourth flow path 124.

One end of the third flow path 123 may be connected to the first direction switching valve 131, and the other end thereof may be connected to the second direction switching valve 132. The third flow path 123 may communicate with the first flow path 121, the second flow path 122, and the fourth flow path 124. The flow cell 140 may be connected to the third flow path 123. For example, the flow cell 140 may be provided at a central portion of the third flow path 123. For example, the filtrate may enter the flow cell 140 after passing through the first direction switching valve 131. The filtrate may pass through the flow cell 140 and then enter the second direction switching valve 132. For another example, the liquid may flow into the second direction switching valve 132, the flow cell 140, and the first direction switching valve 131 in sequence.

One end of the fourth flow path 124 may be connected to the second direction switching valve 132, and the other end thereof may be connected to the second flow path 122. The fourth flow path 124 may communicate with each of the second flow path 122 and the third flow path 123.

The direction switching valves may include the first direction switching valve 131 and the second direction switching valve 132. For example, the direction switching valves may each be a three-way (3-way) valve.

The first direction switching valve 131 may allow at least two flow paths among the first flow path 121, the second flow path 122, and the third flow path 123 to communicate with each other. For example, the first direction switching valve 131 may allow two among the first flow path 121, the second flow path 122, and the third flow path 123 to communicate with each other, or allow all three to communicate with each other. While the first flow path 121 is in communication with the second flow path 122 without being in communication with the third flow path 123, the filtrate flowing in the first flow path 121 may move to the second flow path 122 and may not move to the third flow path 123 and the flow cell 140. While the first flow path 121 is in communication with both the second flow path 122 and the third flow path 123, a portion of the filtrate flowing in the first flow path 121 may move to the third flow path 123 and the flow cell 140, and a remaining portion of the filtrate may move to the second flow path 122.

The second direction switching valve 132 may allow at least two among the third flow path 123, the fourth flow path 124, and the external port 151 to communicate with each other. For example, the second direction switching valve 132 may allow two from among the third flow path 123, the fourth flow path 124, and the external port 151 to communicate with each other, or allow all three to communicate with each other.

The flow cell 140 may be connected to the third flow path 123, and may store the filtrate that has passed through the first flow path 121 and the first direction switching valve 131 while the first flow path 121 and the third flow path 123 are in communication with each other. The filtrate temporarily stored in the flow cell 140 may function as a detection target.

The external port 151 may be provided to communicate with each of the third flow path 123 and the fourth flow path 124. For example, the external port 151 may communicate with at least one from among the third flow path 123 and the fourth flow path 124 through the second direction switching valve 132.

The main pump 152 may be connected to the external port 151. The main pump 152 may inject, into the external port 151, air in the atmosphere, for example. The air injected into the external port 151 may move to the third flow path 123 and/or the fourth flow path 124 through the second direction switching valve 132. According to another example embodiment, the main pump 152 may not be provided. For example, when the pressure inside the vessel port 181 and the vessel V is reduced by the vessel pump 182, external air may be injected into the external port 151 without a separate main pump.

The detector 160 may sense the filtrate stored in the flow cell 140. For example, the detector 160 may optically sense the filtrate. The detector 160 may include, for example, an ultraviolet-visible (UV-VIS) spectrometer and/or a Raman spectrometer. The detector 160 may sense various characteristics of the filtrate in various ways in addition to such optical sensing. The detector 160 may sense the filtrate in real time. The detector 160 may sense the filtrate being in a state stored in the flow cell 140 without a flow. The detector 160 may sense the filtrate flowing along the flow cell 140.

The UV-VIS spectrometer may be coupled to the flow cell 140 and may react to ion concentrations of one or more metals in a solution. The UV-VIS spectrometer may operate through optical absorption using a technique well known to those skilled in the art. The UV-VIS spectrometer may include a light source for measuring absorbance in a specific wavelength range. The UV-VIS spectrometer may be a commercial device using a light-emitting diode (LED). For example, an emission wavelength of the LED may be in a wavelength range between approximately 490 nanometers (nm) and 540 nm. For example, the UV-VIS spectrometer may measure a concentration of a compound by radiating an ultraviolet wavelength. According to another example embodiment, spectrometers operating in various wavelength ranges may also be used to react to different ions. For example, the spectrometer may use a wavelength in a near-infrared ray (NIR) range. In addition, to associate a used spectrometer with a specific ion, a plurality of spectrometers may also be used.

The Raman spectrometer may be coupled to the flow cell 140. The Raman spectrometer may include a light source that emits light at 785 nm. At this wavelength, the Raman spectrometer may react to dimethylamine borane in a plating solution sample and produce an output that reacts to a concentration of dimethylamine borane.

The controller 170 may control each of the first direction switching valve 131 and the second direction switching valve 132. For example, the controller 170 may drive the first direction switching valve 131 to set flow paths that communicate with each other among the first flow path 121, the second flow path 122, and the third flow path 123. The controller 170 may drive the second direction switching valve 132 to set whether to allow the third flow path 123, the fourth flow path 124, and the external port 151 to communicate with each other. According to embodiments of the present disclosure, the controller 170 may include at least one processor and memory storing computer instructions. The computer instructions may be configured to, when executed by the at least one processor, cause the controller 170 to perform its functions.

The vessel port 181 may communicate with the vessel V. The vessel pump 182 and the vessel port 181 may adjust the pressure of the internal space of the pressure control part 103.

The vessel pump 182 may be connected to the vessel port 181 and may control the pressure in the vessel V. For example, the vessel pump 182 may adjust the pressure in the vessel V to a low pressure close to a vacuum.

The filter adapter 190 may support the filter cartridge 110. The filter adapter 190 may seal the filter cartridge 110.

The vessel V may accommodate the filtrate moved downward. The filtrate accommodated in the vessel V may be reused for various purposes of use.

The loader L may support the vessel V. The loader L may move the vessel V in a vertical direction. The loader L may include a linear actuator, for example.

Figure 2A:
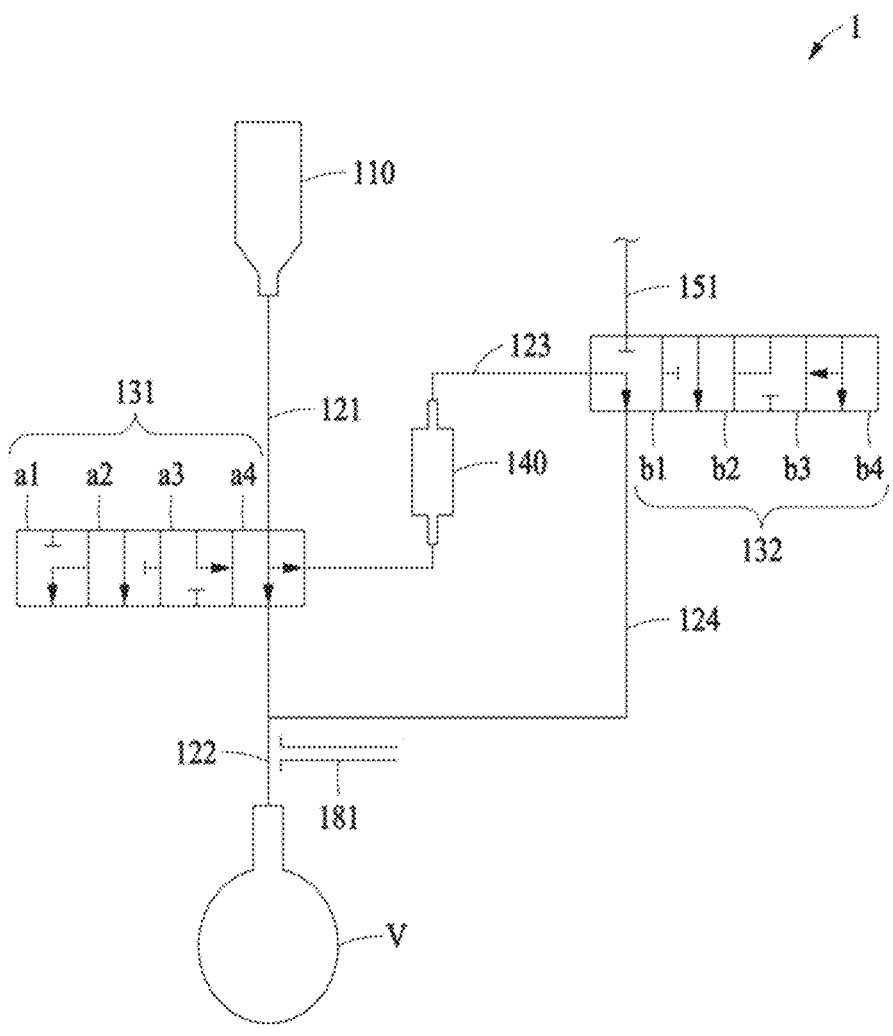
FIG. 2A is a schematic diagram illustrating an example of a batch-type filtering apparatus according to an example embodiment.
Figure 2B:
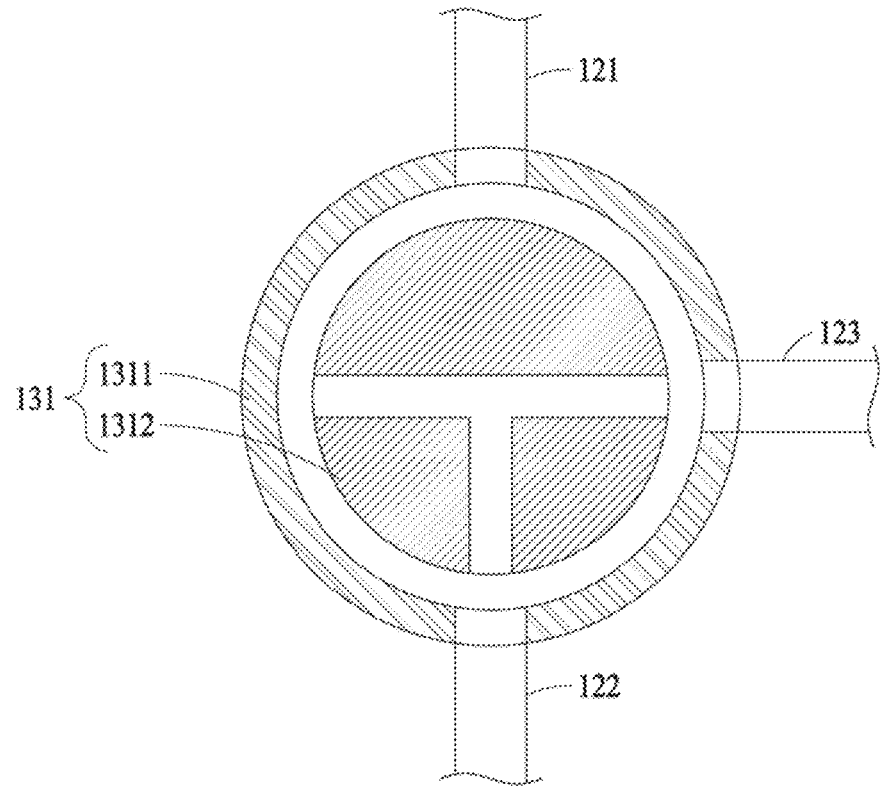
FIG. 2B is a cross-sectional view of an example of a direction switching valve according to an example embodiment.

FIG. 2A is a schematic diagram illustrating an example of a batch-type filtering apparatus according to an example embodiment, and FIG. 2B is a cross-sectional view of a direction switching valve according to an example embodiment.

Referring to FIGS. 2A and 2B, the filtering apparatus 1 may include a filter cartridge 110, a plurality of flow paths (e.g., a first flow path 121, a second flow path 122, a third flow path 123, and a fourth flow path 124), a plurality of direction switching valves (e.g., a first direction switching valve 131 and a second direction switching valve 132), a flow cell 140, an external port 151, a vessel port 181, and a vessel V.

The first direction switching valve 131 may include a valve case 1311 and a valve body 1312. The valve case 1311 may be connected to each of the first flow path 121, the second flow path 122, and the third flow path 123. The valve body 1312 may be rotatably connected to the valve case 1311. The valve body 1312 may rotate in a clockwise or counterclockwise direction based on what is illustrated in FIG. 2B. The valve body 1312 may have a T-shaped flow path. According to embodiments, the second direction switching valve 132 may have a same or similar configuration as the first direction switching valve 131.

The first direction switching valve 131 may have four positions. For example, the first direction switching valve 131 may have a position a1, a position a2, a position a3, and a position a4. The first direction switching valve 131 may be provided at any one of the four positions.

For example, when the first direction switching valve 131 is at the position a1, the second flow path 122 and the third flow path 123 may communicate with each other. When the first direction switching valve 131 is at the position a2, the first flow path 121 and the second flow path 122 may communicate with each other. When the first direction switching valve 131 is at the position a3, the first flow path 121 and the third flow path 123 may communicate with each other. When the first direction switching valve 131 is at the position a4, the first flow path 121, the second flow path 122, and the third flow path 123 may communicate with each other.

The second direction switching valve 132 may have four positions. For example, the second direction switching valve 132 may have a position b1, a position b2, a position b3, and a position b4. The second direction switching valve 132 may be provided at any one of the four positions.

For example, when the second direction switching valve 132 is at the position b1, the third flow path 123 and the fourth flow path 124 may communicate with each other. When the second direction switching valve 132 is at the position b2, the external port 151 and the fourth flow path 124 may communicate with each other. When the second direction switching valve 132 is at the position b3, the external port 151 and the third flow path 123 may communicate with each other. When the second direction switching valve 132 is at the position b4, the third flow path 123, the fourth flow path 124, and the external port 151 may communicate with each other.

The foregoing definitions of the respective positions of the first direction switching valve 131 and the second direction switching valve 132 will be applied in the same way as described above to the following descriptions provided with reference to the following drawings.

Figures 3, 4:
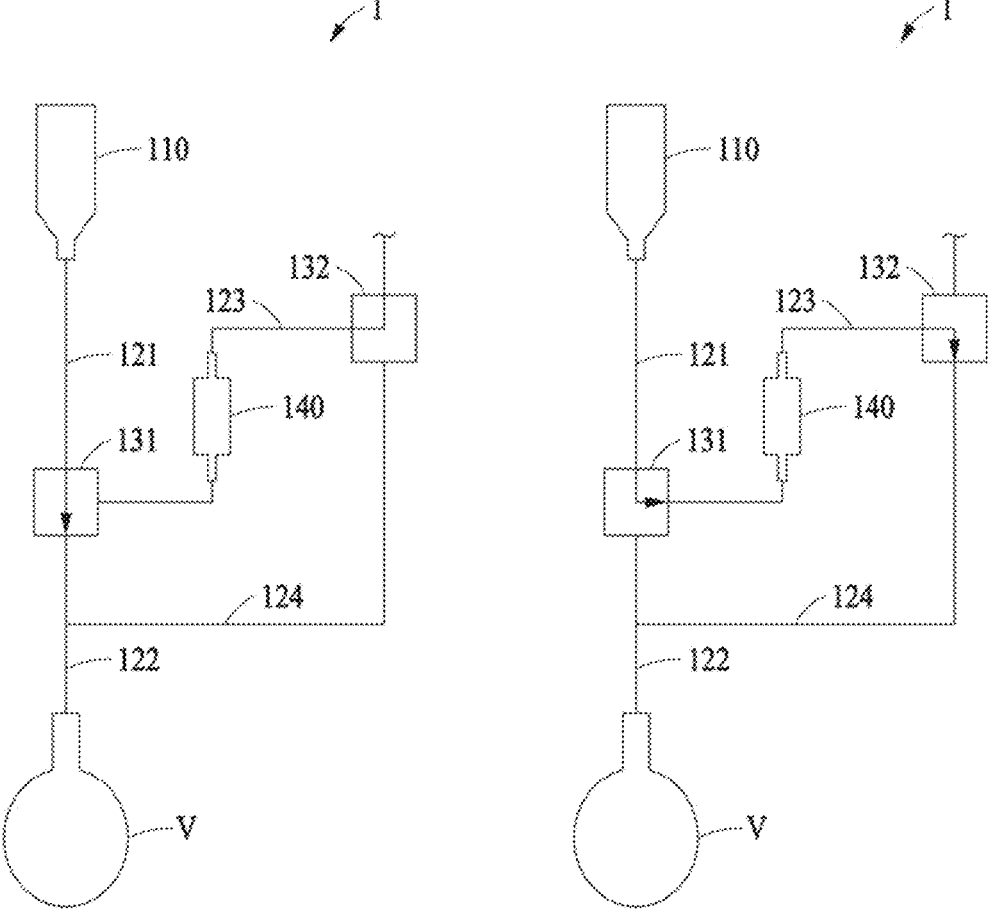
FIG. 3 is a schematic diagram illustrating an example of a batch-type filtering apparatus provided in a one-way type according to an example embodiment.
FIG. 4 is a schematic diagram illustrating an example of a batch-type filtering apparatus provided in a type for sensing according to an example embodiment.

FIG. 3 is a schematic diagram illustrating an example of a batch-type filtering apparatus provided in a one-way type according to an example embodiment.

Referring to FIG. 3, the filtering apparatus 1 may include a filter cartridge 110, a plurality of flow paths (e.g., a first flow path 121, a second flow path 122, a third flow path 123, and a fourth flow path 124), a plurality of direction switching valves (e.g., a first direction switching valve 131 and a second direction switching valve 132), a flow cell 140, and a vessel V. For example, as illustrated, the first direction switching valve 131 may be provided at a position a2, and the second direction switching valve 132 may be provided at a position b3.

For example, in a state where the first flow path 121 is in communication with the second flow path 122 without being in communication with the third flow path 123, filtrate discharged from the filter cartridge 110 may move to the vessel V without passing through the flow cell 140.

FIG. 4 is a schematic diagram illustrating an example of a batch-type filtering apparatus provided in a type for sensing according to an example embodiment.

Referring to FIG. 4, the filtering apparatus 1 may include a filter cartridge 110, a plurality of flow paths (e.g., a first flow path 121, a second flow path 122, a third flow path 123, and a fourth flow path 124), a plurality of direction switching valves (e.g., a first direction switching valve 131 and a second direction switching valve 132), a flow cell 140, and a vessel V. For example, as illustrated, the first direction switching valve 131 may be provided at a position a3, and the second direction switching valve 132 may be provided at a position b1.

For example, in a state where the first flow path 121 is in communication with the third flow path 123 without being in communication with the second flow path 122, filtrate discharged from the filter cartridge 110 may move to the flow cell 140. The filtrate moved to the flow cell 140 may be a sensing target to be sensed. For example, the filtrate stored in the flow cell 140 may be the sensing target to be optically sensed.

A first portion of the flow cell 140 connected to the first direction switching valve 131 may be positioned under a second portion of the flow cell 140 connected to the second direction switching valve 132 with respect to a direction of gravity. This structure may allow the filtrate entering the flow cell 140 to fill in starting from a bottom end of the flow cell 140. As the filtrate fills in starting from the bottom end of the flow cell 140, foam may be less generated less by the filtrate.

FIG. 5 is a schematic diagram illustrating an example of a batch-type filtering apparatus provided in a two-way type according to an example embodiment.

Referring to FIG. 5, the filtering apparatus 1 may include a filter cartridge 110, a plurality of flow paths (e.g., a first flow path 121, a second flow path 122, a third flow path 123, and a fourth flow path 124), a plurality of direction switching valves (e.g., a first direction switching valve 131 and a second direction switching valve 132), a flow cell 140, and a vessel V. For example, as illustrated, the first direction switching valve 131 may be provided at a position a4, and the second direction switching valve 132 may be provided at a position b1.

For example, in a state where the first flow path 121 is in communication with the second flow path 122 and the third flow path 123, a portion of filtrate discharged from the filter cartridge 110 may move to the vessel V without passing through the flow cell 140, and a remaining portion thereof may move to the flow cell 140. The filtrate moved to the flow cell 140 may be guided to the second flow path 122 after passing through the fourth flow path 124. The filtrate moved to the flow cell 140 may be a sensing target to be sensed. For example, the filtrate stored in the flow cell 140 may be the sensing target to be optically sensed.

This structure may allow a solution to flow to all the flow paths (e.g., the first flow path 121, the second flow path 122, the third flow path 123, and the fourth flow path 124) in one direction. The structure may be used to wash the filtering apparatus 1.

FIG. 6 is a schematic diagram illustrating an example of a batch-type filtering apparatus provided in a type for clearing according to an example embodiment.

Referring to FIG. 6, the filtering apparatus 1 may include a filter cartridge 110, a plurality of flow paths (e.g., a first flow path 121, a second flow path 122, a third flow path 123, and a fourth flow path 124), a plurality of direction switching valves (e.g., a first direction switching valve 131 and a second direction switching valve 132), a flow cell 140, a vessel V, and an external port 151. For example, as illustrated, the first direction switching valve 131 may be provided at a position a1, and the second direction switching valve 132 may be provided at a position b4.

The external port 151 may communicate with the third flow path 123 and the fourth flow path 124. Each of the third flow path 123 and the fourth flow path 124 may communicate with the second flow path 122. In this case, external air may be injected into the second flow path 122, the third flow path 123, and the fourth flow path 124, through the external port 151. The external air may allow filtrate left in the second flow path 122, the third flow path 123, and the fourth flow path 124 to be discharged outside or discharged to the vessel V.

Figure 7:
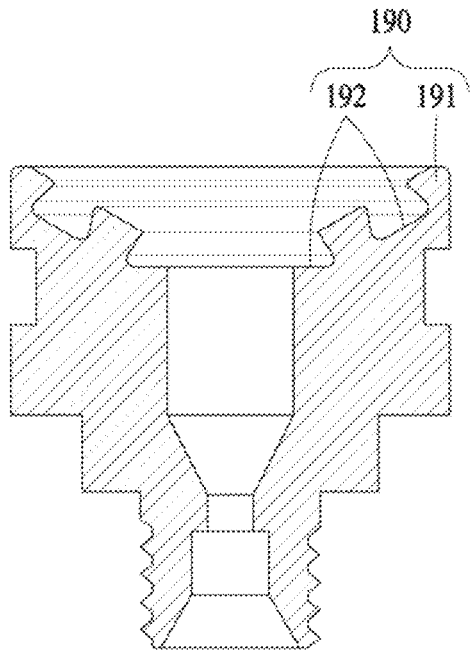
FIG. 7 is a cross-sectional view of an example of a filter adapter according to an example embodiment.

FIG. 7 is a cross-sectional view of a filter adapter according to an example embodiment.

Referring to FIG. 7, a filter adapter 190 may include an adapter body 191 for supporting a filter cartridge, and a plurality of grooves 192 recessed on an inclined surface facing the filter cartridge in the adapter body 191. For example, the grooves 192 may have a dovetail shape. Although the grooves 192 are illustrated as in a shape of two rings, the number of which is not limited thereto.

Figure 8:
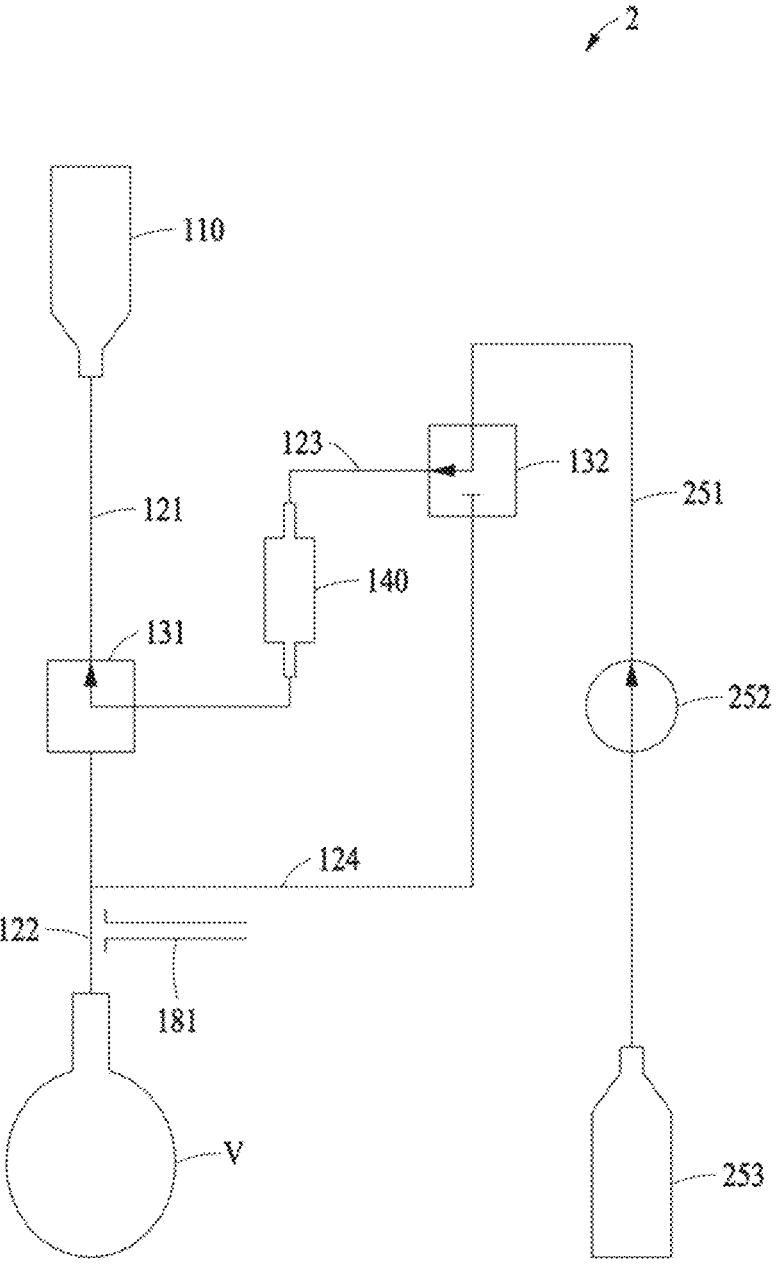
FIG. 8 is a schematic diagram illustrating an example of a batch-type filtering apparatus according to an example embodiment.

FIG. 8 is a schematic diagram illustrating an example of a batch-type filtering apparatus according to an example embodiment.

Referring to FIG. 8, a filtering apparatus 2 may include a filter cartridge 110, a plurality of flow paths (e.g., a first flow path 121, a second flow path 122, a third flow path 123, and a fourth flow path 124), a plurality of direction switching valves (e.g., a first direction switching valve 131 and a second direction switching valve 132), a flow cell 140, a vessel V, a vessel port 181, a solvent flow path 251, a solvent valve 252, and a solvent housing 253.

The solvent flow path 251 may be connected to the second direction switching valve 132. At least two from among the third flow path 123, the fourth flow path 124, and the solvent flow path 251 may communicate with each other by the second direction switching valve 132.

The solvent flow path 251 may guide a solvent stored in the solvent housing 253 to at least one from among the third flow path 123 or the fourth flow path 124.

The solvent housing 253 may store therein the solvent.

The solvent valve 252 may be connected to the solvent flow path 251. The solvent valve 252 may allow the solvent housing 253 and the solvent flow path 251 to communicate with each other, or release (e.g., close) such a communication state between the solvent housing 253 and the solvent flow path 251.

In a case of an occurrence of fouling by a filter cake, the solvent flow path 251, the solvent valve 252, and the solvent housing 253 may assist with the generation of backflow using the solvent. For example, the filtering apparatus 2 may include a pump (not shown) for generating power for guiding the solvent stored in the solvent housing 253 to the third flow path 123 or the fourth flow path 124.

In a case of an occurrence of fouling by a filter cake, the vessel port 181 may assist with the generation of backflow into a plurality of flow paths using air. In this case, the filtering apparatus 2 may include an air pump (not shown) connected to the vessel port 181.

Figure 9:
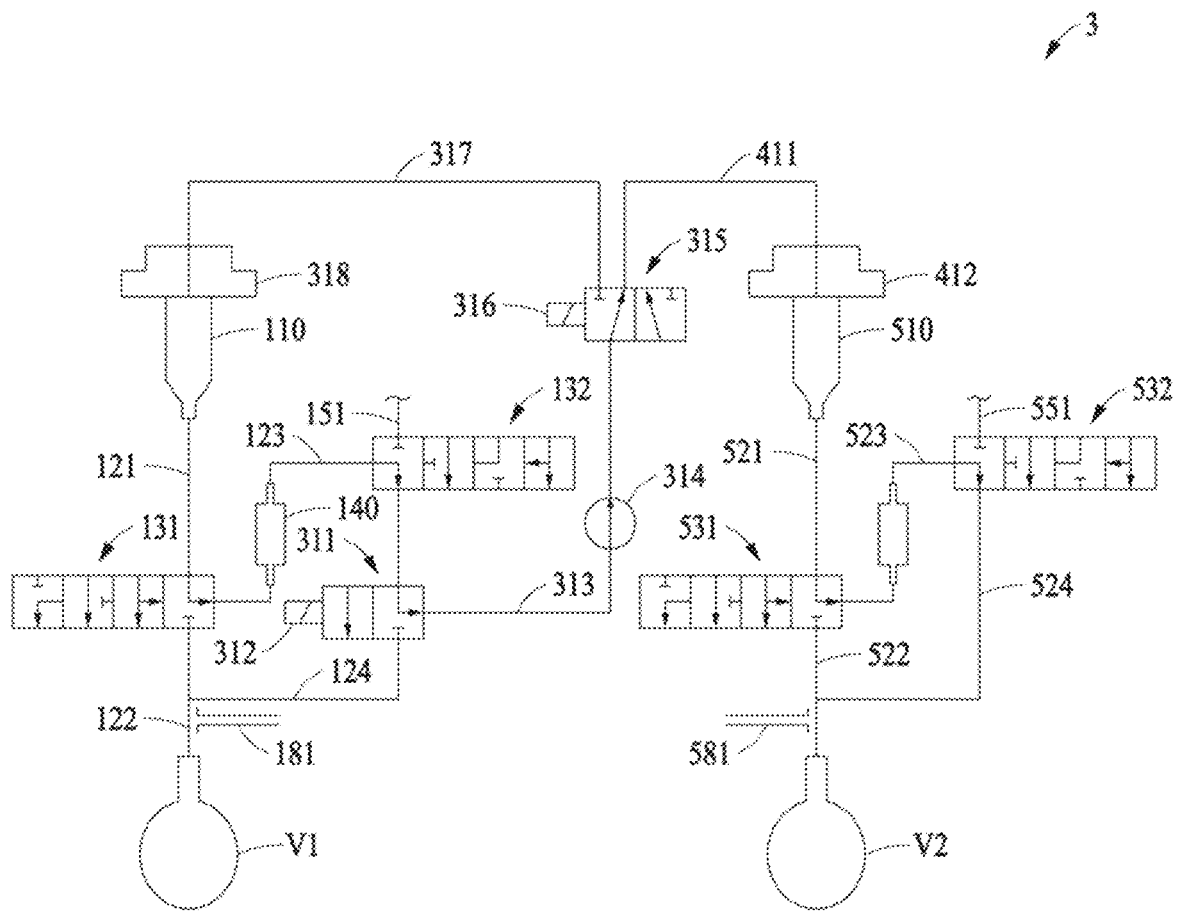
FIG. 9 is a schematic diagram illustrating an example of a batch-type filtering system according to an example embodiment.

FIG. 9 is a schematic diagram illustrating an example of a batch-type filtering system according to an example embodiment.

Referring to FIG. 9, a filtering apparatus 3 (e.g., a batch-type filtering apparatus) may include a plurality of filter cartridges (e.g., a filter cartridge 110 and an auxiliary filter cartridge 510. Although two filter cartridges are illustrated, the number of which is not limited thereto.

The filtering apparatus 3 may include a filter cartridge 110, a plurality of flow paths (e.g., a first flow path 121, a second flow path 122, a third flow path 123, and a fourth flow path 124), a plurality of direction switching valves (e.g., a first direction switching valve 131 and a second direction switching valve 132), a flow cell 140, an external port 151, a vessel port 181, and a vessel V1. The filtering apparatus 3 may include a third direction switching valve 311, a first valve driving motor 312, a fifth flow path 313, an opening and closing valve 314, a fourth direction switching valve 315, a second valve driving motor 316, a main feedback path 317, and an auxiliary feedback path 411. The filtering apparatus 3 may include an auxiliary filter cartridge 510, a plurality of flow paths 521, 522, 523, and 524, a plurality of direction switching valves 531 and 532, a flow cell, an additional external port 551, an additional vessel port 581, and a vessel V2.

The third direction switching valve 311 may be connected to the fourth flow path 124. The third direction switching valve 311 may be provided at two positions. The first valve driving motor 312 may drive the third direction switching valve 311. The first valve driving motor 312 may change a position of the third direction switching valve 311. The fifth flow path 313 may be connected to the third direction switching valve 311. By the first valve driving motor 312, filtrate discharged from the second direction switching valve 132 may move to any one of the vessel V and the fifth flow path 313. The opening and closing valve 314 may open or close the fifth flow path 313.

The fourth direction switching valve 315 may be connected to the fifth flow path 313. The fourth direction switching valve 315 may be provided at two positions. The second valve driving motor 316 may change a position of the fourth direction switching valve 315. By the fourth direction switching valve 315, the fifth flow path 313 may be connected only to one from among the main feedback path 317 and the auxiliary feedback path 411.

For example, when the fifth flow path 313 is connected to the main feedback path 317, the filtrate may return to the filter cartridge 110. The filtering apparatus 3 may collect back the filtrate used for sensing. The filtering apparatus 3 may sense the filtrate multiple times through the main feedback path 317 in a situation where multiple analyses are required.

For example, when the fifth flow path 313 is connected to the auxiliary feedback path 411, the filtrate may move to the auxiliary filter cartridge 510. When a filtering process using different cartridges is required, the filtering apparatus 3 may use a plurality of cartridges using the auxiliary feedback path 411.

The filtering apparatus 3 may include a main adapter 318 for connecting the main feedback path 317 and the filter cartridge 110, and an auxiliary adapter 412 for connecting the auxiliary feedback path 411 and the auxiliary filter cartridge 510.

While non-limiting example embodiments of the present disclosure have been described above, it will be apparent after an understanding of the disclosure of this application that various changes in form and details may be made in these example embodiments without departing from the spirit and scope of the present disclosure. The example embodiments described herein are to be considered in a descriptive sense only, and not for purposes of limitation. Descriptions of features or aspects in each example embodiment are to be considered as being applicable to similar features or aspects in other example embodiments. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is limited by the example embodiments, and all variations and their equivalents are to be construed as being included in the disclosure.

What is claimed is:

1. A batch-type filtering apparatus, comprising:
   a filter cartridge;
   a first flow path configured to guide filtrate received from the filter cartridge;
   a second flow path configured to communicate with the first flow path;
   a third flow path configured to communicate with the first flow path;
   a fourth flow path configured to communicate with each of the second flow path and the third flow path;
   an external port configured to communicate with each of the third flow path and the fourth flow path;
   a first direction switching valve configured to allow at least two from among the first flow path, the second flow path, and the third flow path to communicate with each other;
   a second direction switching valve configured to allow at least two from among the third flow path, the fourth flow path, and the external port to communicate with each other;
   a flow cell connected to the third flow path, and configured to store therein the filtrate that has passed through the first flow path and the first direction switching valve while the first flow path and the third flow path are in communication via the first direction switching valve; and a vessel connected to the second flow path, and configured to store therein the filtrate discharged from the second flow path.

2. The batch-type filtering apparatus of claim 1, wherein the first direction switching valve is configured to cause the first flow path to be in communication with the second flow path without being in communication with the third flow path, and wherein, while the first flow path is in communication with the second flow path without being in communication with the third flow path, the filtrate discharged from the filter cartridge moves to the vessel without passing through the flow cell.

3. The batch-type filtering apparatus of claim 1, wherein the first direction switching valve is configured to cause the first flow path to be in communication with the third flow path without being in communication with the second flow path, and wherein, while the first flow path is in communication with the third flow path without being in communication with the second flow path, the filtrate discharged from the filter cartridge moves to the flow cell.

4. The batch-type filtering apparatus of claim 1, wherein the first direction switching valve is configured to cause the first flow path to be in communication with each of the second flow path and the third flow path, simultaneously, and wherein, while the first flow path is in communication with each of the second flow path and the third flow path, a portion of the filtrate discharged from the filter cartridge moves to the vessel without passing through the flow cell, and a remaining portion of the filtrate moves to the flow cell.

5. The batch-type filtering apparatus of claim 1, further comprising:

a detector configured to sense the filtrate stored in the flow cell.

6. The batch-type filtering apparatus of claim 5, wherein the detector is configured to optically sense the filtrate.

7. The batch-type filtering apparatus of claim 1, wherein a first portion of the flow cell connected to the first direction switching valve is positioned under, with respect to a direction of gravity, a second portion of the flow cell connected to the second direction switching valve.

8. The batch-type filtering apparatus of claim 1, wherein the first direction switching valve and the second direction switching valve are each a three-way valve.

9. The batch-type filtering apparatus of claim 1, further comprising:

a controller configured to control each of the first direction switching valve and the second direction switching valve.

10. The batch-type filtering apparatus of claim 1, further comprising:

a filter adapter comprising:

an adapter body configured to support the filter cartridge; and a plurality of grooves recessed on an inclined surface of the adapter body facing the filter cartridge.

11. The batch-type filtering apparatus of claim 1, further comprising:

a vessel pump connected to the vessel and configured to reduce a pressure in the vessel.

12. The batch-type filtering apparatus of claim 1, further comprising:

a solvent flow path connected to the external port and configured to guide a solvent from an outside to the flow cell.

13. The batch-type filtering apparatus of claim 1, further comprising:

a fifth flow path configured to communicate with the fourth flow path; and a third direction switching valve configured to guide the filtrate that has passed through the second direction switching valve to any one from among the second flow path and the fifth flow path.

14. The batch-type filtering apparatus of claim 13, further comprising:

an auxiliary filter cartridge;

a main feedback path configured to communicate with each of the fifth flow path and the filter cartridge; and an auxiliary feedback path configured to communicate with each of the fifth flow path and the auxiliary filter cartridge.

15. The batch-type filtering apparatus of claim 1, further comprising:

a loader configured to support the vessel and move the vessel.

16. A batch-type filtering apparatus, comprising:

a first flow path;

a second flow path configured to communicate with the first flow path;

a third flow path configured to communicate with the first flow path;

a fourth flow path configured to communicate with each of the second flow path and the third flow path;

an external port configured to communicate with each of the third flow path and the fourth flow path;

a first direction switching valve configured to allow at least two from among the first flow path, the second flow path, and the third flow path to communicate with each other;

a second direction switching valve configured to allow at least two from among the third flow path, the fourth flow path, and the external port to communicate with each other; and a flow cell connected to the third flow path, and configured to store therein filtrate that has passed through the first flow path and the first direction switching valve while the first flow path and the third flow path are in communication via the first direction switching valve.

17. The batch-type filtering apparatus of claim 16, further comprising:

a detector configured to sense the filtrate stored in the flow cell.

18. The batch-type filtering apparatus of claim 17, wherein the detector is configured to optically sense the filtrate.

19. The batch-type filtering apparatus of claim 16, wherein a first portion of the flow cell connected to the first direction switching valve is positioned under, with respect to a direction of gravity, a second portion of the flow cell connected to the second direction switching valve.

20. The batch-type filtering apparatus of claim 16, further comprising:

a controller configured to drive each of the first direction switching valve and the second direction switching valve.

* * * * *